United States Patent

[11] 3,598,259

| [72] | Inventor | Preston M. Wright<br>R. R. 2, Box 110A, Syracuse, Ind. 46567 |
|---|---|---|
| [21] | Appl. No. | 16,383 |
| [22] | Filed | Mar. 4, 1970 |
| [45] | Patented | Aug. 10, 1971<br>Continuation-in-part of application Ser. No. 804,818, Mar. 6, 1969. |

[54] AIRCRAFT TOWING APPARATUS
3 Claims, 5 Drawing Figs.

| [52] | U.S. Cl. | 214/332 |
|---|---|---|
| [51] | Int. Cl. | B60s 9/16 |
| [50] | Field of Search | 214/330, 331, 332, 334 |

[56] References Cited
UNITED STATES PATENTS
2,874,861  2/1959  Arnot ......................... 214/332

FOREIGN PATENTS
412,674  10/1970  Italy ..................  214/333

*Primary Examiner*—Gerald M. Forlenza
*Assistant Examiner*—George F. Abraham
*Attorney*—Woodard, Weikart, Emhardt and Naughton ABSTRACT: The present invention is embodied in a powered towing apparatus for aircraft in which the aircraft and the driving wheels of the prime mover, or tractor component, are connected by a linkage which transfers a portion of the aircraft weight to the driving wheels to aid traction. The linkage sequentially grasps the nose wheel tire on the aircraft and then lifts the aircraft nose wheel through this tire grip. The tire gripping components clasp the tire, prior to lifting, even though the nose wheel tire is not centered or accurately aligned between the gripping components of the linkage.

PATENTED AUG 10 1971　　　3,598,259

INVENTOR
PRESTON M. WRIGHT
BY
Woodard, Weikart, Emhardt & Naughton
ATTORNEYS

AIRCRAFT TOWING APPARATUS

This patent application is a continuation-in-part of my Pat. application Ser. No. 804,818, filed Mar. 6, 1969 and titled "Aircraft Towing Apparatus."

BACKGROUND OF THE INVENTION

1. Field of the Invention

The apparatus, broadly, is a motor vehicle of the driven, steering type which is adapted for raising the nose wheel of an aircraft from the ground and towing the aircraft over, for example, the ramp and hanger area of an airport. Increased use of private and light-commerical and executive aircraft has made highly desirable for aircraft facilities a towing apparatus for such aircraft which is relatively inexpensive and trouble free and which can be operated by relatively unskilled airport employees. Aircraft, of even the smaller, private type, represent a substantial investment and any damage to the landing gear of the aircraft, for example, during towing by airport employees can be costly for the responsible aircraft facility and, further might be the proximate cause of subsequent landing accidents involving the tow-damaged aircraft, resulting in liability for much greater damage. The nose wheel structure in aircraft of the type under discussion is usually mounted on a swivel-caster assembly, the caster being capable of being swiveled only through a limited arc of the order of 30°. If, in towing, the nose wheel is turned through an arc exceeding this, damage to the caster structure will occur. Thus, if the powered tow apparatus is turned too short, turning the aircraft nose wheel beyond the limit of its caster mounting, damage to the nose wheel portion of the aircraft landing gear will occur. Occurrence of such damage cannot always be easily detected by the operator of the towing vehicle and, when it is detected, it often goes unreported. Additionally, since the design and actual physical size of the nose wheel and its carriage varies widely with the various makes of aircraft, any towing attachment specialized for one type of model of aircraft will, quite likely, be unsatisfactory for another type.

2. Description of the Prior Art.

Conventional light aircraft apparatus utilizes one form or another of a tow bar having a rigid, mechanical connection to the stem portion or yoke portion of the aircraft's nose wheel mounting. Typical of these are the structures disclosed in U.S. Pat. No. 2,919,933 and No. 3,049,253. The apparatus disclosed herein, and disclosed and claimed in my copending patent application Ser. No. 804,818 mentioned above, provides a connecting device between an aircraft nose wheel and the drive wheel of a towing apparatus in which gripping members sequentially clasp the nose wheel tire and then lift the front end of the aircraft by lifting the nose wheel.

SUMMARY OF THE INVENTION

The inventive concept of the present invention provides an improved nose wheel gripping linkage which does not require precise positioning or aligning of the aircraft nose wheel with the gripping components of the towing apparatus.

DESCRIPTION OF THE PREFERRED EMBODIMENT

Figure 1:
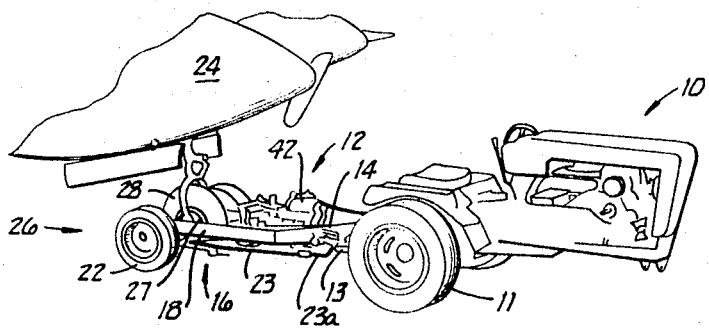
FIG. 1 is a perspective view of an aircraft towing apparatus embodying the present invention.

Referring initially to FIG. 1, the aircraft towing apparatus embodying the present invention includes a tractor component indicated generally at 10 having powered drive wheels 11 and a towing frame 12. The towing frame is composed of a leading component 13 rigidly attached to the axle housing or similar part of the tractor component, this leading portion 13 of the frame having a pivotal connection by means of the pin 14 to the trailing frame portion generally indicated at 16. The pivotal attachment of the frame portion 16 with the frame portion 13 includes a further pivotal component (not shown) which permits limited tilting of the frame portion 16 transversely with relation to the frame portion 13 to thus permit motion of the frame portion 16 when the towing apparatus moves over uneven or rutted ground.

Figure 2:
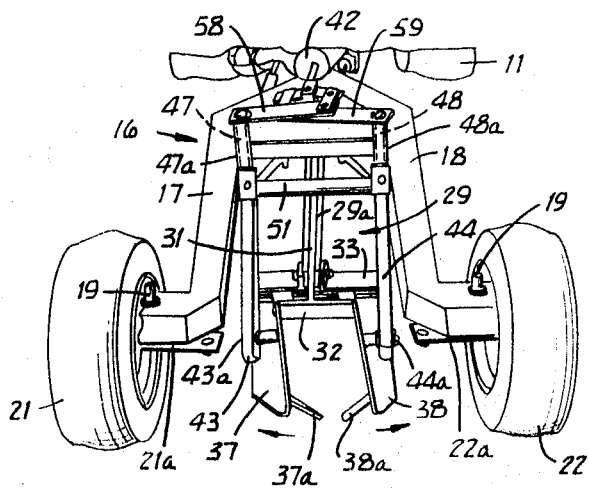
FIG. 2 is a perspective view showing a portion of the main frame of the apparatus and the associated parts.

The trailing portion 16 of the towing frame 12 is bifurcated, as will be evident from FIG. 2 forming legs 17 and 18. Outwardly extending portions of the legs 17 and 18 support king pins 19 which pivotally support trailing wheels 21 and 22. Arms 21a and 22a (FIG. 2) have pivotal connections to stationary rods 23 (FIG. 1) which have pivotal connections at 23a to a transverse member rigidly secured to the stationary component 13 of the towing apparatus. The function of the rods 23 and the arms 21a and 22a is to assure that the trailing wheels 21 and 22 track with the wheels 11 in steering the apparatus, to be subsequently described.

As will be evident from FIG. 1, an aircraft 24, having a depending nose wheel caster 26, is supported by a nose wheel 27 carrying a nose wheel tire 28. As may best be seen in FIG. 2, a member 29, composed of spaced walls 29a, is rigidly secured to the apex portion of the frame 16 and extends centrally between the legs 17 and 18. Received between the walls 29a is a member 31 which, at its free end carries a central plate or abutment 32. A generally rectangular, centrally slotted retaining member 33 is pivotally attached, by means of flanges 33a and pin 34 (FIG. 3) to the members 29a and the member 31.

Opposed shoes 37 and 38, which may be formed with an angle iron configuration, extend between the legs 17 and 18 and are adapted to grasp the nose wheel tire of an aircraft. The shoes have plates 37a and 38a extending angularly inwardly from the vertical flange of the shoes 37 and 38, respectively. As may best be seen in FIG. 3, a portion of the vertical flange of the shoes is cut away permitting the flat end portions 41 to extend freely through the slot enclosed by the retaining member 33. The retaining member 33 thus serves to hold the end of the shoes loosely but permits limited transverse movement of the shoes. The inwardly extending portions 37a and 38a of the shoes, as will be evident from FIG. 5, extend across the tread area of the aircraft nose wheel tire while the vertical flange portions of the shoes grip, when closed toward each other, the sidewall of the aircraft nose wheel tire.

Figure 4:
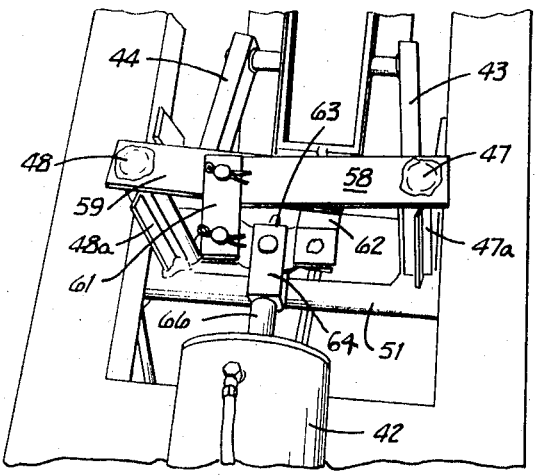
FIG. 4 is an enlarged, perspective view of a portion of the apparatus shown in FIG. 3.

Motion for the and 38, 37 and 38 is provided by means of a linkage which extends between the shoes and a power means which takes the form of a hydraulic cylinder 42. The linkage consists of lift arms 43 and 44 which are pivotally connected to the shoes 37 and 38, respectively (FIG. 4). The lift arms 43 and 44 extend toward the apex of the frame portion 16 and are rigidly secured to the lower ends of upright shafts 47 and 48, respectively. The upright shafts are enclosed in bearing tubes 47a and 48a. The tubes are rigidly secured, by welding or other suitable means, to a generally horizontal rockshaft 51 which, as may best be seen in FIG. 4, spans the space between the frame legs 17 and 18 and is journaled in suitable bearings carried by the legs.

Figure 3:
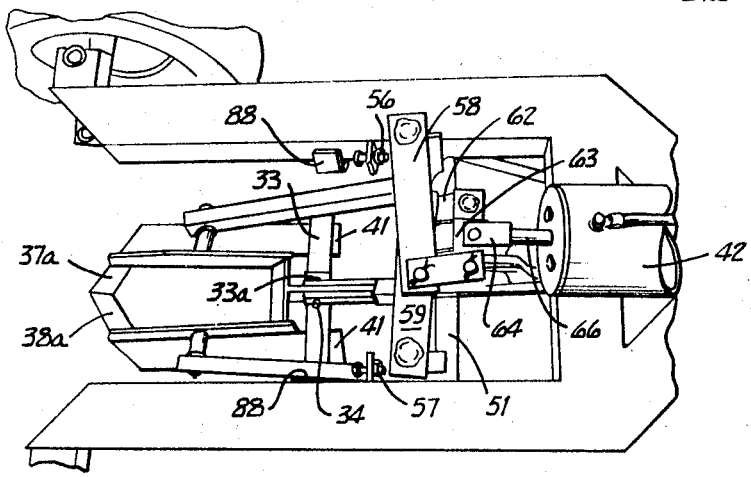
FIG. 3 is a top view of the apparatus shown in FIG. 2.

The upright shafts 4 and 48, since rigidly attached by the rockshaft 51, tilt longitudinally upon rotation of the rockshaft and means for limiting the axial rotation of the rockshaft takes the form of stop abutments 56 and 57 (FIG. 3). As may best be seen in FIGS. 3, 4 and 5, rigidly secured to the upper ends of the upright shafts 47 and 48 are sidewardly extending crank members 58 and 59. The free ends of the crank members 58 and 59 overlap and are pivotally joined to the ends of link members 61 and 62. The link members 61 and 62 are, in turn, pivotally connected to an elongated element 63 and this member 63 is pivotally connected, intermediate its ends, to a U-shaped bracket 64. The bracket 64 is carried at the end of a thrust rod 66 of a hydraulic cylinder forming the power means 42 previously referred to with reference to FIGS. 1 and 2.

Figure 5:
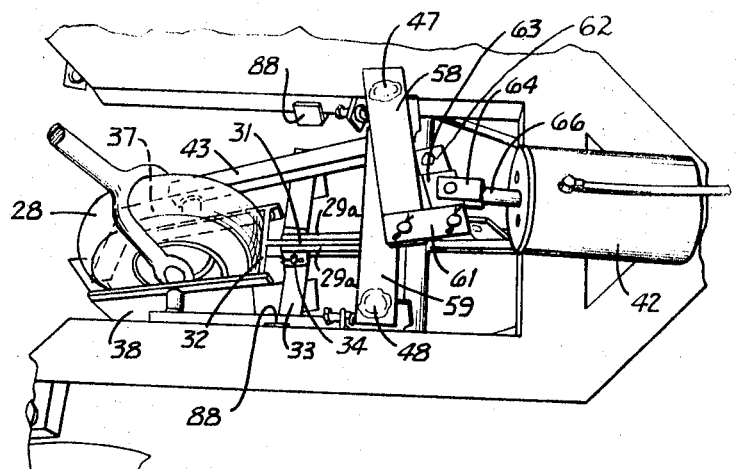
FIG. 5 is a view similar to FIG. 3 but showing the apparatus in a position differing from that of FIG. 3.

In operation, referring particularly to FIGS. 3 and 5, with the thrust rod 66 extended, that is, extending leftwardly as viewed in FIG. 3, the vertical shafts 47 and 48 will have an axial and a rotational position such that the shoes 37 and 38 will embrace the nose wheel tire of an aircraft positioned between them. When the aircraft wheel is substantially centered between the frame legs 17 and 18, retracting motion of the thrust rod 66 (rightwardly as viewed in FIG. 3) will, through the linkage provided by the link members and crank arms initially serve to move the shoes toward each other so as to tightly grip the tire and when further squeezing or gripping motion of the shoes is blocked, further retraction of the thrust rod 66 will tilt the vertical shafts 47 and 48 so as to raise the shoes and the nose wheel of the aircraft. This action is substantially the same as that occuring in the apparatus described in my said copending patent application Ser. No. 804,818. With the presently described linkage apparatus, however, should the nose wheel not be centered between the legs 17 and 18, a condition illustrated in FIG. 5, the shoes will nevertheless be moved to grip the tire and lift the nose wheel as the thrust rod 66 is retracted. Under such uncentered condition of the aircraft nose wheel, as illustrated in FIG. 5, initial retracting movement of the thrust rod 66 will, because of the multiple pivot connection provided by the link members 61 and 62, move the vertical shaft 47 and its corresponding shoe an additional increment after the shoe 38 has been stopped after engagement with the nose wheel until the shoe 37 also is in tight engagement with the nose wheel, and the accomplishment of the gripping action of the shoes is thus not dependent on centering of the aircraft nose wheel between the frame legs 17 and 18. As previously described, subsequent retracting movement of the thrust rods 66, after the aircraft nose wheel is gripped will result in tilting of the vertical shafts 47 and 48 so as to raise the shoes 37 and 38 and the aircraft nose wheel. Inclined cam members or abutments, identified at 88 in FIGS. 3 and 5, serve to nudge the assembly toward the center of the space between the legs 17 and 18 as the shoes are elevated by tilting of shafts 47 and 48. The linkage structure described thus assures that even though the aircraft nose wheel is not centered between the frame legs, action of the power means will complete the gripping motion of the shoes before lifting action of the nose wheel is initiated by tilting of the vertical shafts 47 and 48.

I Claim:

1. An aircraft towing apparatus or the like adapted to grasp an aircraft nose wheel, said apparatus including a towing frame, power means mounted on the frame, tire gripping shoes spaced from each other and adapted to grip opposite sidewalls of the nose wheel tire, and motion transmitting linkage means extending between said shoes and said power means, said linkage means comprising upright shafts mounted for axial rotation on said frame adjacent said shoes, lift arms extending from said upright shafts adjacent their lower ends and each having a pivotal connection to one of said tire engaging shoes, a crank member extending from adjacent the upper end of each of said upright shafts toward the other shaft, an elongated element pivotally attached intermediate its ends to said power means, each of said element having a link member pivotally attached to and joining said element to one of said crank members, whereby upon movement of said elongated element by said power means in one direction said upright shafts are axially rotated to move said shoes toward each other to grip an aircraft nose wheel tire positioned between them, the motion of said power means transmitted through said elongated element, link members and crank arms continuing to be transferred to that one of the shoes free to be moved after the other has been halted by engagement with the nose wheel tire thereby causing the tire to be gripped by the shoes even though the shoes do not simultaneously engage the tire.

2. An aircraft towing apparatus as claimed in claim 1 in which said towing frame is bifurcated with one of said upright shafts being supported adjacent each of the frame legs and said nose wheel engaging shoes being disposed within the bight of said bifurcated frame.

3. An aircraft towing apparatus as claimed in claim 2 in which said power means takes the form of a hydraulic cylinder mounted at the apex of said bifurcated frame.